Patented Oct. 24, 1950

2,526,859

UNITED STATES PATENT OFFICE 2,526,859

CATALYTIC HYDROGENATION OF BETA-NAPHTHOL TO PRODUCE BETA-TETRALONE

Emanuel Leon Foreman and Gilbert J. Stork, Milwaukee, Wis., assignors to The Lakeside Laboratories Inc., Milwaukee, Wis., a corporation of Wisconsin No Drawing. Application July 12, 1946, Serial No. 683,146

10 Claims. (Cl. 260—590)

This invention relates to an improved process for the preparation of keto derivatives of naphthalene and particularly to the preparation of $\beta$-tetralone from $\beta$-naphthol.

The most successful of the prior processes for the preparation of $\beta$-tetralone or 2-keto-1,2,3,4-tetrahydronaphthalene involve the use of metallic sodium with its inherent hazards of burning and exploding. The handling of relatively large quantities of sodium requires special and rigidly enforced safety precautions, to prevent injury to operators and such precautions are difficult, to maintain in quantity productive operations. In the above indicated process, $\beta$-naphthol methyl ether or 2-methoxynaphthalene requires reducing with sodium and ethyl alcohol, acid hydrolysis and other steps which must be carried out in distinct operations at relatively high cost and with losses in each operation.

In another process in which $\beta$-naphthol is used, and in which only a single operation is required, liquid ammonia is used with its attendant hazards to personnel and the inconvenience of operating at low temperatures. The second process involves the further difficulty of removing liquid ammonia from the reaction mixture at the end of the reaction period. Further, $\beta$-tetralone is very unstable in strong basic solutions and produces an undesired colored product known as tetralone blue.

$\beta$-tetralone may be used as an intermediate in the preparation of products of therapeutic value.

It is therefore one object of the present invention to provide a process for preparing the keto derivatives of naphthalene and which is suited for quantity production and from which good yields are obtained.

Another object of the present invention is to provide a process for preparing the keto derivatives of naphthalene in which the use of metallic sodium and liquid ammonia is avoided.

Another object of the invention is to provide a process for producing $\beta$-tetralone from $\beta$-naphthol and in which only a single reaction operation is required to obtain the desired product.

A further object of the invention is to provide a process for producing 2-keto-1,2,3,4-tetrahydronaphthalene from 2-hydroxynaphthalene by a single reaction and in which the reagents are used in a manner suitable for mass production of the end product.

And another object of the invention is to provide a process for producing $\beta$-tetralone from $\beta$-naphthol by a catalytic hydrogenation process under conditions suitable for mass production without special equipment or special precautions and which will produce good yields.

Generally, the present process involves the hydrogenation of $\beta$-naphthol or its substitution products to $\beta$-tetralone or its substitution products in the presence of a catalyst, such as palladium, which hydrogenation was heretofore thought to be impossible. The action is facilitated and improved by the use of an alkaline reaction promoter, such as an organic amine. The pressures and temperatures involved are suitable for quantity production and are well within the limitations of equipment now available. Yields up to 45% of theoretical are obtained in a reaction mixture from which $\beta$-tetralone can be readily recovered without the formation of tetralone blue. The reaction taking place has not been definitely established but it is believed that the catalyst reduces the keto form of $\beta$-naphthol to produce a saturated ketone and that the production of the keto form of $\beta$-naphthol is favored by the presence of the organic base.

Generally, we prefer to treat a solution of $\beta$-naphthol in ethyl alcohol in the proportions of about a mole of $\beta$-naphthol in 300–350 ml. of alcohol, with hydrogen under substantial superatmospheric pressure varying from 1000 to 4000 lbs. per square inch gauge and in the presence of a hydrogenation catalyst, such as palladium charcoal, the quantity of palladium employed varying from .1 of 1% to 10% of the weight of the $\beta$-naphthol to be reduced. The temperature may vary from 100° to 300° C. dependent on the hydrogen pressure available, the higher pressures permitting use of lower temperatures and vice versa. Pressures of 1600 to 2500 lbs. and temperatures of 150° to 250° C. have been found preferable. The reaction is preferably continued until approximately one mole of hydrogen is absorbed per mole of $\beta$-naphthol used, and the reaction is stopped before two moles of hydrogen are absorbed per mole of $\beta$-naphthol which would produce a preponderance of the tetrahydro derivatives of $\beta$-naphthol. Such reaction is completed in from 10 to 20 hours dependent on the pressure, temperature and the activity of the catalyst employed.

After the reaction is terminated, the reaction mixture is treated differently dependent on whether or not an organic base has been used as a reaction promoter, the proportions of organic base to $\beta$-naphthol being preferably half a mole of the base per mole of $\beta$-naphthol. If an organic base is used, such base is first removed by treatment of the reaction mixture with acid. The reaction mixture, or the mixture minus the organic base, is then separated from the alcohol and the reaction products are then fractionally distilled at reduced pressures, to obtain the β-tetralone in the lower boiling point fraction. Such fraction is then treated with sodium bisulfite in solution and the β-tetralone separates as the solid bisulfite addition compound, from which the β-tetralone itself may be obtained, as by heating with dilute acid, as is well known.

It will be understood that either β-naphthol or its substitution products may be used as starting materials. When such substitution products are used, the end products of course, will be the similar substitution products of β-tetralone.

The following examples are illustrative of the present process but the invention is not to be limited thereby:

I

A solution is made of 144 gms. of β-naphthol as commercially available in 240 mls. of "Commercially absolute" ethyl alcohol, and the solution is placed in a reaction vessel capable of withstanding a raised pressure and temperature. 10 gms. of palladium charcoal, containing approximately 5% palladium, is mixed in the solution and the vessel is closed. Hydrogen, as now commercially available, is then supplied to the vessel at a pressure of approximately 1600 lbs. per square inch and the vessel is then heated to approximately 180° C. Heating is continued with shaking until approximately one mole of hydrogen is absorbed per mole of β-naphthol which occurs in 20 hours, whereupon the heating is interrupted and the vessel is cooled to room temperature. The reaction mixture is then removed from the vessel and the catalyst is removed by filtration. The alcohol is distilled off at atmospheric pressure and the residue is distilled at the reduced pressure of 25 mms. to obtain a fraction boiling at temperatures up to 166° C. Such fraction consists of a mixture of β-tetralone and the tetrahydro derivative of β-naphthol which is treated with a saturated sodium bisulfite solution to produce the solid bisulfite addition compound of β-tetralone. Such compound is then filtered out of the mixture, is washed with ethyl ether, and is dried.

The β-tetralone itself may be readily obtained from the bisulfite addition compound by the well-known method of treatment with 10% sulfuric acid and warming.

II

A mixture is made of ethyl alcohol and 25 mls. of commercially available N-ethyl morpholine which is an organic amine, and 72 gms. of β-naphthol is dissolved in the mixture, the morpholine acting as a reaction promoter but not itself taking part in the reaction. The total solution of 250 mls. in volume and 5 gms. of the palladium charcoal catalyst are placed in the reaction vessel. Hydrogen is admitted to the vessel at a pressure of 2500 pounds and the vessel is then heated to a temperature of 175° C. One mole of hydrogen is absorbed per mole of β-naphthol in approximately fifteen hours, whereupon the catalyst is filtered out of the reaction mixture. The reaction product is then distilled at atmospheric pressure to remove the alcohol whereupon the pressure is reduced to 21 mms. to obtain 51 gms. of a fraction boiling at 162° C. under the reduced pressure and 21 gms. of higher boiling recovered starting material. The first fraction is then treated with the bisulfite solution and the solid addition compound is washed with ether which removes the tetrahydronaphthol. The washing ether solution was distilled in the present instance and 21 gms. of 2-hydroxy-1,2,3,4-tetrahydronaphthalene was recovered which is a by-product useful for preparation of pharmaceutical intermediates. The bisulfite addition compound is then treated to recover the β-tetralone of which a yield of 30 gms. (40%) was obtained.

IIa

If it is desired to avoid darkening of the reaction mixture, due to the presence of the basic reaction promoter and air, the process of Example II is performed to the stated end point of the reaction. The morpholine is then extracted by use of an excess of hydrochloric acid. A clear orange-yellowish liquid mixture is obtained which is washed with water, dried by the use of a drying agent, such as anhydrous sodium sulfate, and distilled to remove the alcohol. The mixture is then distilled at 5 mms. of pressure to obtain a fraction boiling at 116 to 135° C. at that pressure. The distillate is treated with the bisulfite solution to obtain 50 gms. of the addition compound of β-tetralone which is equivalent to a yield of 40% of the desired product.

It will be seen from the above that the present invention provides a process suitable for mass production under ordinary plant conditions rather than laboratory scale production only under meticulous supervision. The use of sodium and liquid ammonia is avoided, thus eliminating hazards to personnel in the use of the above materials. The reaction takes place in a single step which is simpler, quicker, and produces better yields than the multiple steps heretofore employed. Hence, the desired substance can be produced more economically than heretofore.

We claim:

1. In a process for converting 2 hydroxynaphthalene to 2 keto tetrahydronaphthalene, making a solution of the 2 hydroxynaphthalene, adding N-ethyl morpholine as a reaction promoter, mixing a hydrogenation catalyst comprising palladium charcoal with the solution, and treating the mixture with hydrogen at a pressure range from 1000 to 4000 lbs. and at a temperature ranging from 100 to 300° C.

2. In a process for producing a 2 keto tetrahydronaphthalene from a 2 hydroxynaphthalene, treating the 2 hydroxynaphthalene with hydrogen in the presence of a catalyst comprising palladium and at pressures ranging from 1000 to 4000 lbs. and temperatures ranging from 150° to 250° C. until one mole of hydrogen is absorbed per mole of 2 hydroxynaphthalene.

3. In a process for producing a 2 keto tetrahydronaphthalene from a 2 hydroxynaphthalene, treating the 2 hydroxynaphthalene with hydrogen in the presence of a catalyst comprising palladium charcoal and at pressures ranging from 1600 to 2500 lbs. and temperatures ranging from 150° to 250° C. until one mole of hydrogen is absorbed per mole of 2 hydroxynaphthalene.

4. In a process for manufacturing beta-tetralone from beta-naphthol, treating the beta-naphthol with hydrogen in the presence of a palladium charcoal catalyst at a pressure ranging from 1600 to 2500 pounds, and at a temperature ranging from 100° to 300° C. until one mole of hydrogen is absorbed per mole of beta-naphthol.

5. In a process for manufacturing beta-tetralone from beta-naphthol, making a solution of the beta-naphthol, adding a tertiary amine comprising N-ethyl morpholine, mixing a hydrogenation catalyst comprising palladium charcoal in the solution, and treating the mixture with hydrogen at presures from 1000 to 4000 pounds, and at temperatures from 100° to 300° C., until between one and two moles of hydrogen per mole of beta-naphthol are absorbed in the mixture.

6. In a process for manufacturing beta-tetralone from beta-naphthol, making a solution of the beta-naphthol, adding N-ethyl morpholine as a reaction promotor, mixing a hydrogenation catalyst comprising palladium charcoal in the solution, treating the mixture with hydrogen at pressures from 1600 to 2500 pounds, and at temperatures from 150° to 250° C., until substantially one mole of hydrogen has been absorbed per mole of beta-naphthol used, and distilling the reaction product to obtain a fraction containing the beta-tetralone.

7. In a process for manufacturing beta-tetralone from beta-naphthol, making a solution of the beta-naphthol, adding N-ethyl morpholine as a reaction promotor, mixing a hydrogenation catalyst comprising palladium in the solution, treating the mixture with hydrogen at pressures of 1600 to 2500 pounds, and temperatures of 150° to 250° C., until one mole of hydrogen has been absorbed per mole of beta-naphthol used, and distilling the reaction product at reduced pressures to obtain a fraction containing the beta-tetralone.

8. In a process for manufacturing beta-tetralone from beta-naphthol, making a solution of the beta-naphthol, adding N-ethyl morpholine to the solution as a reaction promotor, mixing a hydrogenation catalyst comprising palladium with the solution, adding hydrogen to the mixture at a pressure ranging from 1600 to 2500 lbs. heating the mixture to a temperature of 150° to 250° C. for 15 hours, and fractionating the mixture to obtain beta-tetralone.

9. In a process for manufacturing beta-tetralone from beta-naphthol, making a solution of the beta-naphthol, adding N-ethyl morpholine to the solution as a reaction promotor, mixing a hydrogenation catalyst comprising palladium charcoal with the solution, adding hydrogen to the mixture at a pressure ranging from 1600 to 2500 lbs., heating the mixture to a temperature of 150° to 250° C., until between one and two moles of hydrogen per mole of beta-naphthol are absorbed by the mixture, removing the N-ethyl morpholine from the solution, and fractionating the mixture to obtain beta-tetralone.

10. In a process for manufacturing beta-tetralone from beta-naphthol, making a solution of the beta-naphthol, adding N-ethyl morpholine to the solution as a reaction promotor, mixing a hydrogenation catalyst comprising palladium with the solution, adding hydrogen to the mixture at a pressure ranging from 1600 to 2500 lbs., heating the mixture to a temperature of 150° to 250° C., neutralizing the N-ethyl morpholine with acid and removing the compound formed by neutralization, and fractionating the mixture to obtain beta-tetralone.

EMANUEL LEON FOREMAN.
GILBERT J. STORK.

REFERENCES CITED

The following references are of record in the file of this patent:

FOREIGN PATENTS

| Number | Country | Date |
| --- | --- | --- |
| 352,720 | Germany | May 3, 1922 |

OTHER REFERENCES

Musser, Jour. Am. Chem. Soc., 60, pages 664–669 (1938).

Palfray, Compt. Rend. 206, pages 1976–1978 (1938).

Leroux, "Annales de Chimie et de Physique," Series 8, vol. 21 (1910), pages 458–549 (only pages 483–484 necessary).